United States Patent [19]

Ghelfi et al.

[11] Patent Number: 5,122,310
[45] Date of Patent: Jun. 16, 1992

[54] GAS/LIQUID DISTRIBUTOR FOR A COUNTER-CURRENT COLUMN

[75] Inventors: Lorenzo Ghelfi, Uster; Raymond C. Pluss, Klein-Andelfingen, both of Switzerland

[73] Assignee: Sulzer Brothers Limited, Winterthur, Switzerland

[21] Appl. No.: 706,236

[22] Filed: May 28, 1991

[30] Foreign Application Priority Data

Jun. 13, 1990 [CH] Switzerland ............ 01976/90

[51] Int. Cl.⁵ .................................. B01F 3/04
[52] U.S. Cl. .................................... 261/97
[58] Field of Search .......................... 261/97

[56] References Cited

U.S. PATENT DOCUMENTS

| 3,259,380 | 7/1966 | Brown | 261/97 |
| 3,281,133 | 10/1966 | Eckert | 261/97 |
| 4,427,605 | 1/1984 | Meier et al. | 261/97 |
| 4,689,183 | 8/1987 | Helms et al. | 261/97 |
| 4,839,108 | 6/1989 | Silvey | 261/97 |

FOREIGN PATENT DOCUMENTS

| 1501390 | 6/1969 | Fed. Rep. of Germany . |
| 0642566 | 4/1984 | Switzerland . |
| 0527299 | 10/1940 | United Kingdom . |

Primary Examiner—Tim Miles
Attorney, Agent, or Firm—Kenyon & Kenyon

[57] ABSTRACT

The gas/liquid distributor for a counter-current column has tubes for the liquid with outlets extending almost to the column portion underneath. At least ten flues per square meter of area of the distributor base are provided for guiding and distributing the upward-flowing gas. The total flow cross-section of the flues is not more than 10% of the area of the base which fills the entire column cross-section. The flow cross-sections of the flues are constricted in addition to their relatively narrow inlet cross-sections.

20 Claims, 6 Drawing Sheets

GAS/LIQUID DISTRIBUTOR FOR A COUNTER-CURRENT COLUMN

This invention relates to a gas/liquid distributor for a counter-current column.

As is known, various types of distributors have been provided for counter-current columns by which a liquid can be distributed across the cross section of the column. In addition, various types of gas/liquid distributors have been known for positioning between two exchange portions of a counter-current column. In such cases, for example as described in Swiss Patent 642,566, the distributors have been constructed with a base on which liquid may collect, a plurality of upstanding vapor flues through which rising vapor may ascend and a plurality of tubes in the base for draining off liquid in a downward direction. However, the efficiency of the known distributors for separating gas from liquid flowing in counter-current is relatively low, particularly when used in counter-current columns with a flow parameter Phi greater than 0.1, as defined by the formula:

$$Phi = L/G \text{ times } (Rho_G/Rho_L)^{\frac{1}{2}},$$

where L and G are the the mass flows of liquid and gas (vapor) respectively and $Rho_L$ and $Rho_G$ are the densities of liquid and gas, respectively. These high flow parameters, which represent the ratio of the kinetic energy of the flowing liquid and the flowing gas, occur e.g. in high-pressure distillation columns at column pressures of more than 5 bars, and in absorption columns with very high liquid loads.

In high-pressure distillation columns, in which the pressure is more than 5 bars, the gas density is high— e.g. from 300 to 500 kg/m$^3$. The result is a relatively small density ratio $Rho_{liquid}$ to $Rho_{gas}$ ($Rho_L/Rho_G$), e.g. less than about 10. The relatively dense gas therefore easily entrains liquid, particularly when the liquid has a low surface tension resulting in a number of small droplets. This makes it difficult to separate liquid from gas in the aforementioned columns, which are used e.g. in petroleum distillation or for separating light hyrdrocarbons.

Furthermore, the speed ratio of gas and liquid in a high pressure distillation column is relatively low, e.g. likewise about 10. The gas flow is therefore unstable. High-pressure distillation installations comprising columns containing regular packing or random packings in the exchange portions, are therefore inefficient at separation. Consequently, plate columns have usually been used for high-pressure distillation. However, plate columns have the disadvantage of a small active area for distillation, e.g. only 15% of the column cross-section, the remainder being taken up by downcomers.

Accordingly, it is an object of the invention to provide a gas/liquid distributor which insures a uniform supply of gas and liquid to an adjacent upper or lower packing bed in a counter-column.

It is another object of the invention to maintain stable gas and liquid flow conditions in the region between the packing beds of a counter-current column.

It is another object of the invention to maximize the productivity of a counter-current column.

Briefly, the invention provides a gas/liquid distributor for a counter-current column which is comprised of a base for extending across the cross-section of a column, a plurality of vapor flues which extend through the base for conveying vapor flows in an upward direction and a plurality of tubes which depend from the base for draining off liquid distributed between the vapor flues.

In accordance with the invention, the vapor flues are distributed over the base at a density of at least ten flues per square meter of base with a total flow cross-sectional area equal to at most 10% of the cross-sectional area of a base. In addition, each flue has a constriction in the flow cross-section thereof relative to an inlet cross-section. Such a constriction may be between ½ to 1/5 of the inlet cross section.

The gas-liquid distributor is constructed for mounting in a counter-current column between at least a pair of vertically spaced apart portions containing packing elements for a vapor-liquid exchange. In this respect, the tubes extend downwardly so that the outlets of the tubes are at a point at least 30 mm from a respective exchange portion of the column.

In the prior art, the flow cross-section for the gas has been given the maximum size—about 30 to 50% of the total cross-section—in order to reduce the pressure drop in the distributor. According to the invention, the cross-section for the gas flow is deliberately made small and an increased pressure loss is aimed at. Contrary to previous views, it has been found that this is necessary for uniform distribution of the gas, even and particularly at relatively low flow speeds. This uniform distribution is obtained by a pressure head, which is achieved in each distributor by reducing the total flow cross-section for the gas. The gas speed is simultaneously increased, with the result that the gas flow is withdrawn from the influence of the liquid to a greater extent than hitherto.

Another result of the distributor is that gas and liquid are guided along separate flow paths, very largely separate from one another, between each pair of exchange portions of the column.

It has been found advantageous if the tubes for the liquid extend at least up to 30 mm from the column portion underneath and if at least 150 tubes for draining off liquid are provided per square meter of the bottom (base).

To prevent the liquid from being "sucked" from filled tubes by a siphon effect—such "suction" results in uncontrollable, non-uniform flows of liquid in the tubes—the tubes are ventilated at a very short distance under the base. For this purpose, at least one opening can be formed in the tube wall, just below the base.

In order to substantially separate the flow paths as mentioned, the gas outlets of the flues extend to very near an upper portion of the column, the distance therefrom being e.g. not more than 50 mm. With regard to the constriction of the flow paths in the flues, good results have been obtained by reducing the cross-sections to ½ to 1/5 of the inlet cross-section. Advantageously, also constrictions are situated at each flue outlet, to enable any gas which condenses into liquid to flow out of the flue. Uniform distribution of the gas is additionally promoted if the flue outlet openings comprise a number of small outlet tubes disposed in a ring around the flue.

Finally, according to a feature which is advantageous for assembly reasons, particularly in the case where flues extend almost up to an exchange portion, the flues are vertically divided.

Simple assembly is desirable due to the number of flues. To this end, the flues are held by a bead in openings through the base and are clamped by rails spaced apart from the base. The spacing between the rails and base ensures that liquid is not prevented from draining away through tubes disposed under the rails.

Optionally, duct-like troughs for collecting and thoroughly mixing the liquid are provided inside the distributor and are closed in part, whereas a second part is formed with at least one bottom outlet for the liquid, the bottom outlet advantageously being situated at the end of the trough and/or obtained by omitting an end wall of the trough.

On the other hand, the bottom outlet may comprise a number of openings distributed over not more than half, advantageously a quarter, of the trough length. The openings can be disposed either at the end or in the middle of the trough length.

The liquid can be collected and mixed by the aforementioned troughs in a particularly efficient manner if the bottom outlets of the troughs disposed on the same level point in diametrically opposite directions. Another efficient arrangement is obtained if a trough with a bottom outlet in the middle is disposed between two troughs with "end outlets". According to another advantageous feature, the troughs are in two layers, with their longitudinal axes at right angles to one another.

As mentioned above, the gas/liquid distributors are particularly used in counter-current columns with a flow parameter Phi greater than 0.1.

These and other objects and advantages of the invention will become more apparent from the following detailed description taken in conjunction with the accompanying drawings wherein:

BRIEF DESCRIPTION OF THE DRAWINGS

Referring to FIG. 1, the counter-current column 1 is constructed as a vertically disposed high-pressure distillation column comprising exchange portions 2A, 2B, e.g. packing beds containing regular packing elements such as corrugated lamellar elements as described in Swiss Patent 398,503.

As illustrated, the portions 2A, 2B as separated by a free space in which a gas/liquid distributor 4 is disposed.

The distributor 4 is constructed of a base 5 which extends across the cross-section of the column and which is supported on brackets 6 on a wall of the column 1. The base or tank bottom 5 serves to collect descending liquid thereon.

Figure 5:
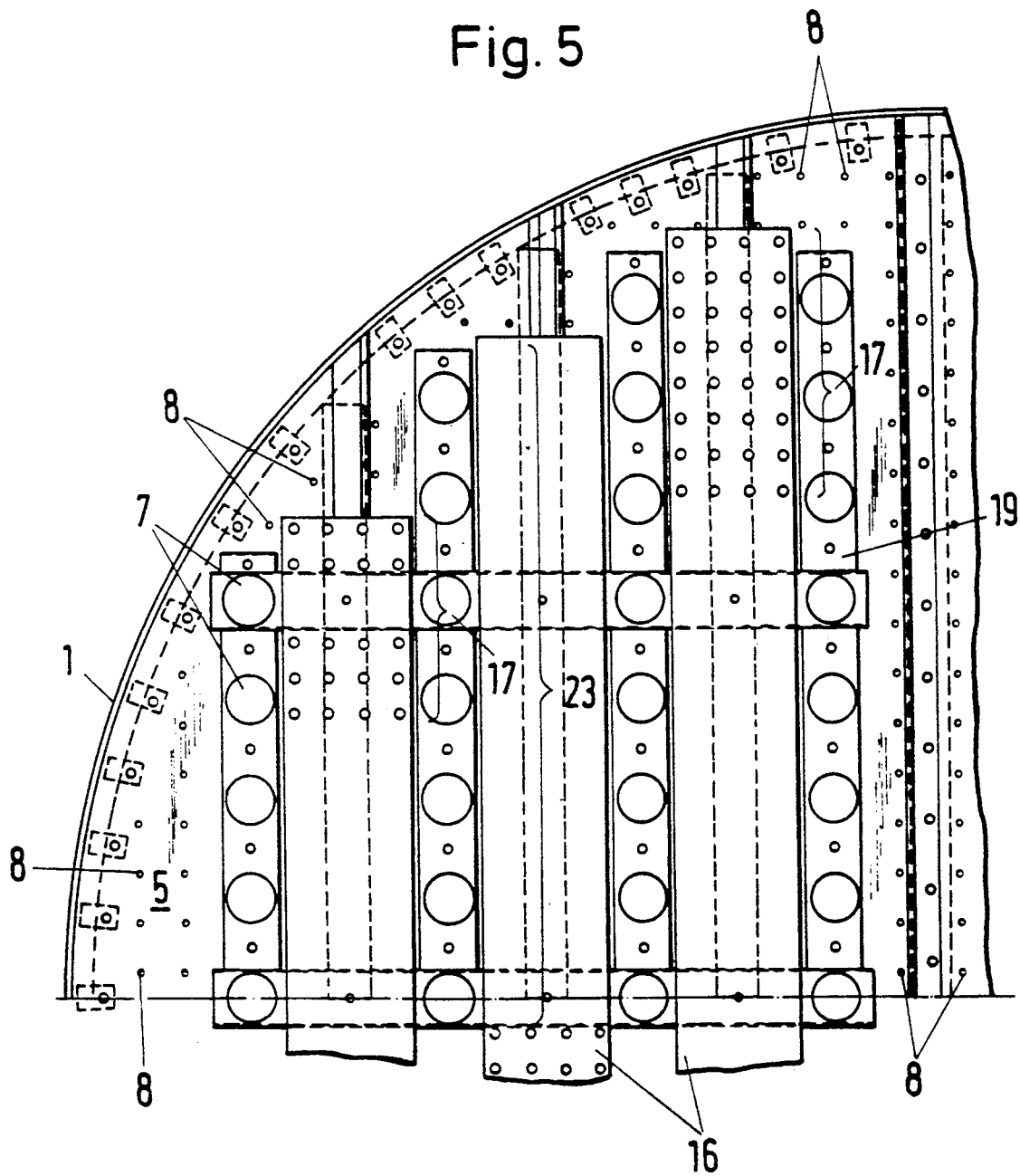
FIG. 5 illustrates a view in section perpendicular to the column axis showing part of a column cross-section and an arrangement of troughs therein.

The distributor 4 also has a number of vapor flues 7 formed in the bottom 5 which, as shown in FIG. 5, are arranged in lines or rows uniformly over the cross-section of the column 1. The distributor 4 also has a plurality of tubes 8 mounted between the lines or rows of flues 7. At least ten (10) flues 7 and at least one hundred fifty (150) tubes 8 are provided per square meter in the free column. In the present example, there are twenty flues 7 and one hundred and eighty tubes 8 per square meter.

Figure 2:
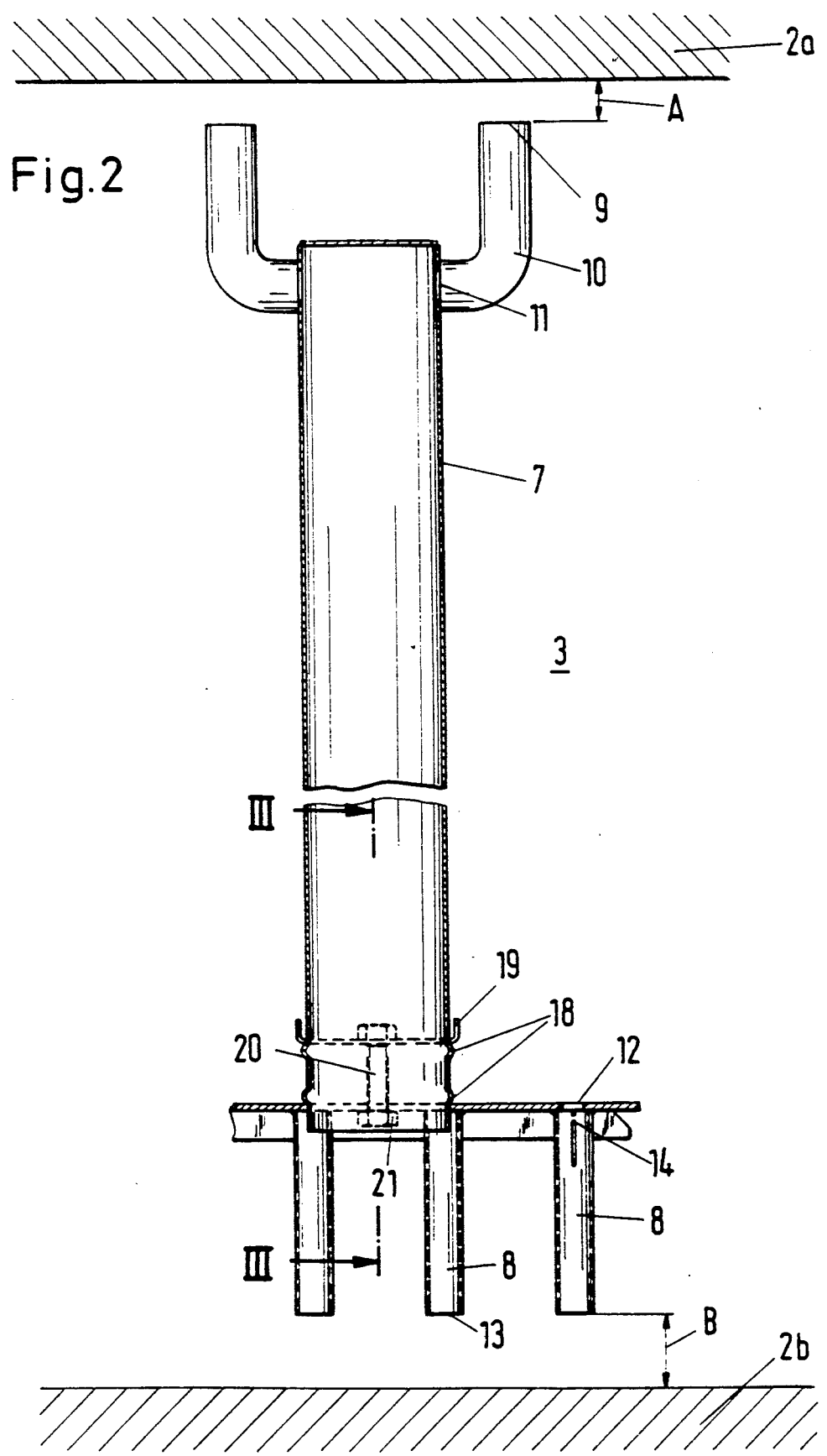
FIG. 2 illustrates an enlarged view of a gas/liquid distributor of FIG. 1.

The gas flues 7 extend almost as far as the column portion 2a disposed above the space 3 and downstream in the flow direction of the gas and have gas outlets 9 thereat. The distance A (FIG. 2) of the outlets 9 from the upper portion 2a is 30 mm in the present case. In the present example, the outlets 9 of a flue 7, the total cross-section of which is equal to about a third of the inlet cross-section for gases in a flue 7, are in the form of angular pipes 10 laterally secured to the surface of the flue 7 and connected for flow purposes to the interior of the flue 7 via constricted cross-sections 11. Of course, the gas outlets 9 can have other forms, e.g. holes distributed round the periphery of the flue surface, or an annular slot and cover or the like. The angular pipes 10 shown, however, particularly when disposed in a ring around a flue 7, have the advantage that gas flowing out of each flue 7 is distributed over an area larger than the flue cross-section. Due to the small distance A, the gas phase and the liquid phase flowing in counter-current have little opportunity to influence one another, and this improves the separation between the two phases.

The tubes 8 are welded to the base 5 and are connected by bores 12, the cross-section of which is less than the tube cross-section to liquid 15 (FIG. 1) "stored" on the base 5. The outflow ends or outlets 13 (FIG. 2) of the tubes 8 extend almost as far as the column portion 2b. The distrance B therefrom is 30 mm in the present case. As a result of this feature, liquid reaches the next column portion 2b without being appreciably exposed to the counter-current of gas. As before, therefore, the gas flow can entrain only a little liquid, thus improving the separation between the two. The large number of tubes 8 ensures a uniform distribution of liquid trickling on to portion 2b.

To prevent liquid from being "sucked" out of tubes 8 filled with liquid, the tubes 8 are ventilated near the bores 12 by means of peripherally distributed slots 14.

Figure 1:
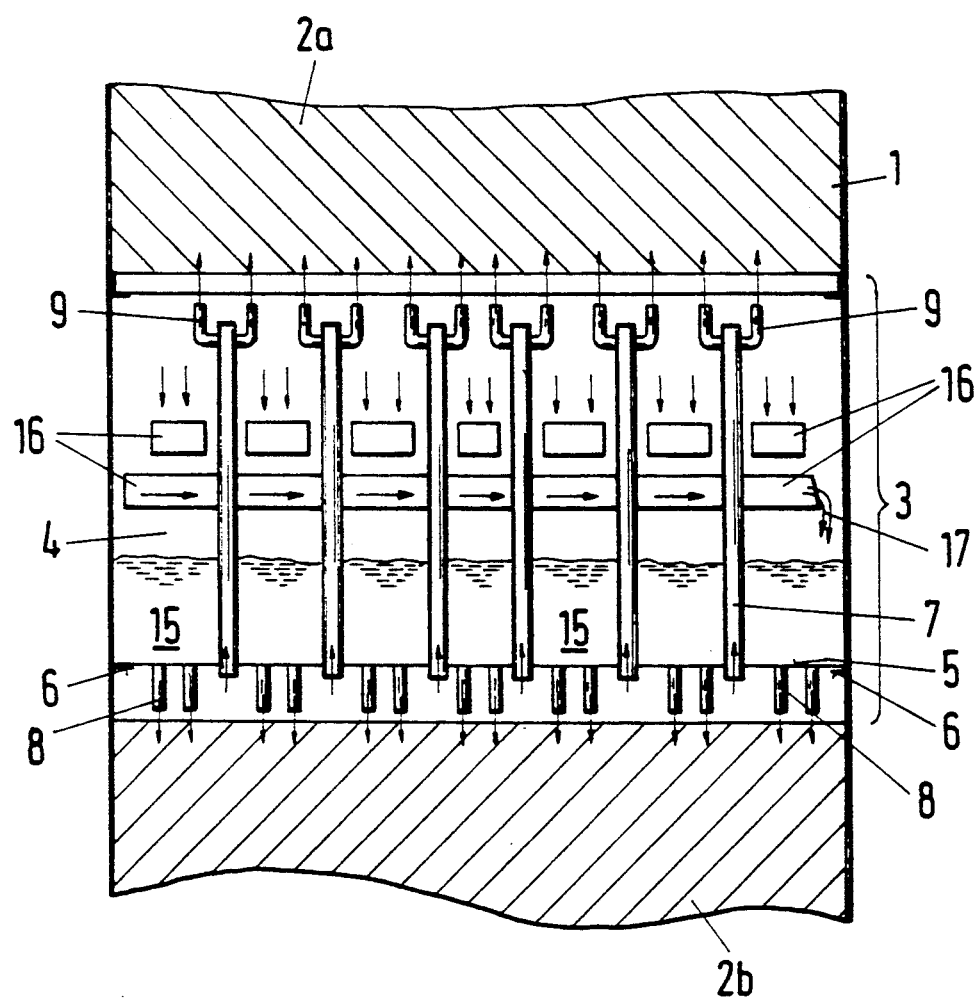
FIG. 1 illustrates a part cross-sectional view of a counter-current column employing a gas/liquid distributor constructed in accordance with the invention.
Figure 6:
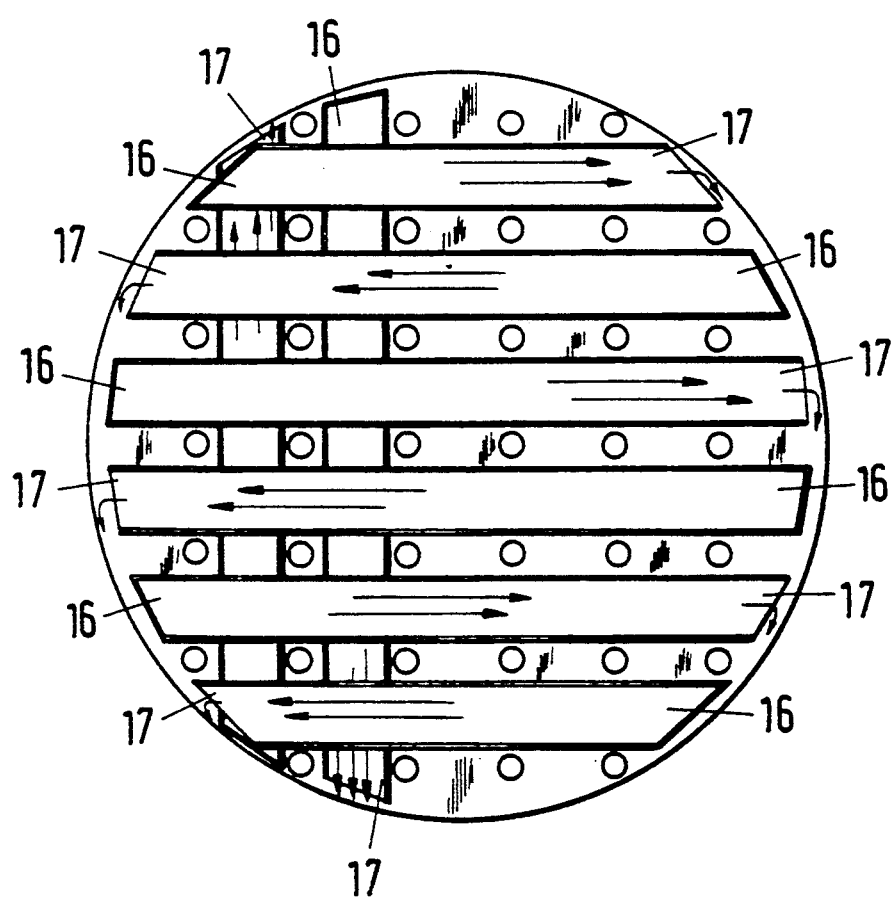
FIG. 6 illustrates a view similar to FIG. 5 of an arrangement of troughs in a column as shown in FIG. 1.

Referring to FIG. 1, troughs 16 extending above the level of liquid 15 are provided in the space 3 across the entire column cross-section and are disposed in two layers, the longitudinal axes of the troughs 16 in one layer being at right angles to the axes of the second layer. The troughs 16, the construction of which will be described hereinafter, are so formed that liquid can flow out only through a bottom outlet 17 near one end. By this means, the liquid trickling along a trough length is collected over the entire column cross-section and thoroughly mixed before reaching the "lake" 15. The thorough mixing is further improved by the fact that the "outlet ends" of the troughs 15 in each layer point alternately in diametrically opposite directions, as shown in FIGS. 5 and 6. Alternatively, some troughs 16 in a level can have a bottom outlet in the middle, and these troughs 16 can be disposed so as to alternate with troughs having outlets at the end.

Figure 3:
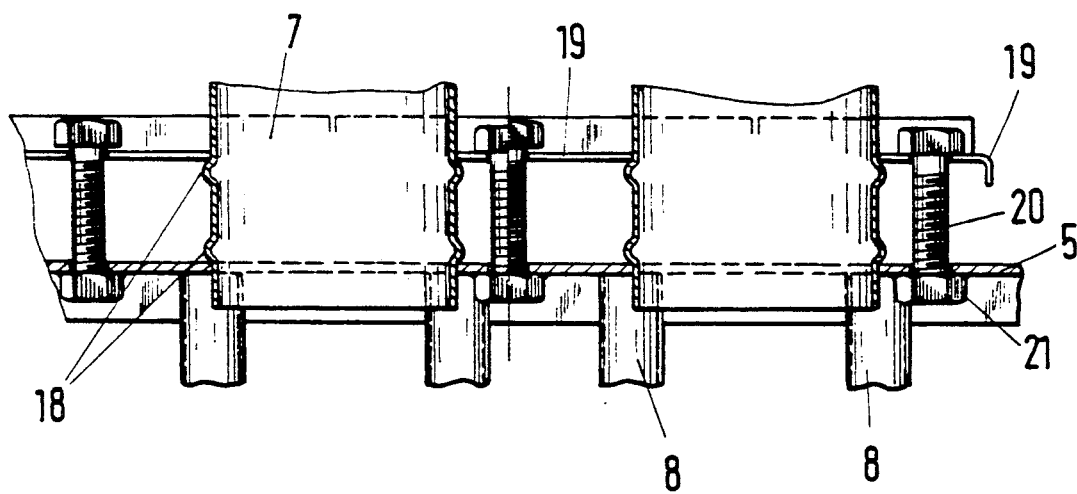
FIG. 3 illustrates a view taken on line III—III of FIG. 2.

For simplified assembly in the base 5, the flues 7 are formed with two annular beads 18 near their base (see FIG. 2) and are clamped in place between the base 5 and rails 19. A clamping effect is achieved by bolts 20 (see FIG. 3) disposed between the flues 7 and screwed into nuts 21 welded to the underside of the base 5. This method of securing, as compared e.g. with welding the flues 7 into the base 5, results in a relatively simple assembly, through a manhole if required and also enables individual flues 7 to be replaced at any time. Due to the spacing between the beads 18, liquid can drain unhindered, even in the regions under the rails 19.

Figure 4:
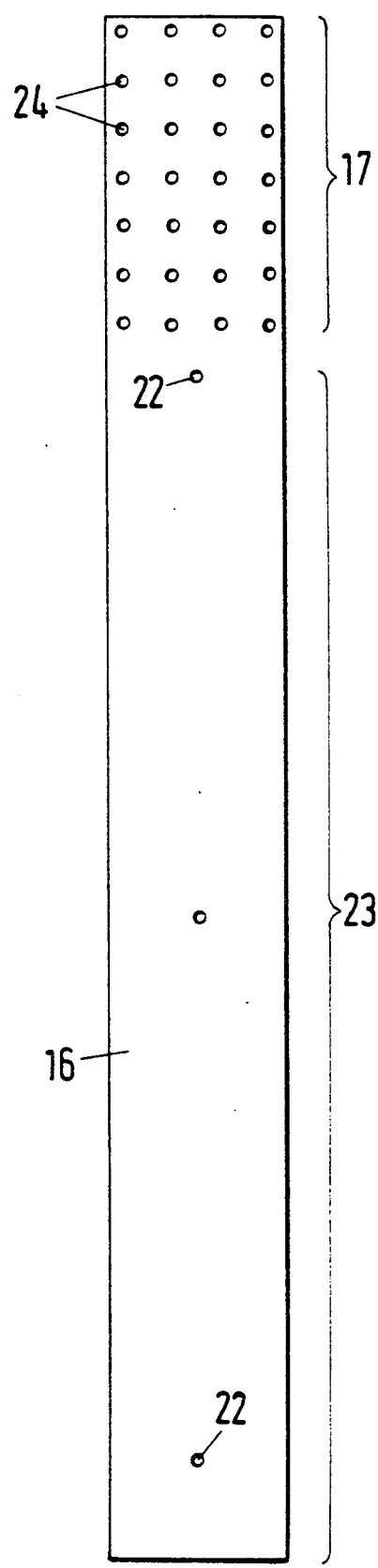
FIG. 4 illustrates a top view of a trough for distributing liquid across a distributor of FIG. 1.

The aforementioned duct-like troughs 16, which are formed e.g. at the bottom with bores 22 for screwing to supporting grids (not shown) have a bottom divided into a closed portion 23 and into the aforementioned portion serving as a bottom outlet 17. In FIGS. 4 and 5, the bottom outlet 17 comprises a plurality of openings 24 concentrated at one end or in the middle of a trough 16 and extending over a length which is not more than ½ and preferably only ¼ of the length of the trough. Alternatively, the bottom outlet 17 can advantageously be disposed at the end of a trough 16 and can be formed by leaving out an end wall of the trough, as shown in the troughs in FIGS. 1 and 6. The purpose and arrangement of troughs 16 in space 3 have already been described.

The invention thus provides a gas/liquid distributor having a relatively high efficiency for separating gas from liquid flowing in counter-current. The invention further provides a gas/liquid distributor which ensures a uniform supply of gas and liquid to adjacent upper and lower packing beds of a counter-current column while maintaining stable gas and liquid flow conditions in the region between the packing beds.

The invention further provides a gas/liquid distributor which is capable of maximizing the productivity of a distillation column.

The invention further provides a gas/liquid distributor for a counter-current column which provides for a uniform gas distribution as a result of a static gas pressure. Further, the distributor allows gas and liquid to be guided substantially separately when flowing through the space between column portions while allowing a relatively high gas speed to be obtained. This substantial separation of the flow paths, particularly in counter-current columns with a flow parameter Phi of greater than 0.1, improves the stability of the gas and liquid flow and thus improves the efficiency of the counter-current column.

What is claimed is:

1. A gas/liquid distributor for a counter-current column comprising
   a base for extending across a cross-section of a column;
   a plurality of vapor flues extending through said base for conveying vapor flows in an upward direction, said vapor flues being distributed over said base at a density of at least ten flues per square meter of base and having a total flow cross-sectional area equal to at most 10% of the cross-sectional area of said base, each said flue having a constriction in the flow cross-section thereof relative to an inlet cross-section; and
   a plurality of tubes depending from said base for draining off liquid distributed between said flues.

2. A distributor as set forth in claim 1 wherein said constriction is between ½ to 1/5 of said inlet cross-section.

3. A distributor as set forth in claim 1 wherein each flue is divided vertically.

4. A distributor as set forth in claim 1 wherein said constriction is at an outlet of a respective flue.

5. A distributor as set forth in claim 1 which further comprises a plurality of outlet tubes in communication with and extending circumferentially about each respective vapor flue for exhausting vapor therefrom.

6. A distributor as set forth in claim 1 wherein said tubes are distributed over said base at a density of at least 150 tubes per square meter of base.

7. A distributor as set forth in claim 1 wherein each tube has at least one vent opening below said base.

8. A distributor as set forth in claim 1 wherein each vapor flue has a pair of longitudinally spaced apart beads thereon with one of said beads abutting said base and which further comprises a plurality of rails, each said rail being disposed on a respective row of said flues with each rail abutting a second respective bead on a respective flue.

9. A distributor as set forth in claim 1 which further comprises a plurality of duct-like troughs above said base for distributing liquid therefrom, each said trough having a first closed part for containing liquid therein and a second part having at least one outlet for liquid.

10. A distributor as set forth in claim 9 wherein said outlet in said second part is disposed at one end of each respective trough.

11. A distributor as set forth in claim 9 wherein said second part has a plurality openings distributed over at least one quarter of the length of a respective trough.

12. A distributor as set forth in claim 11 wherein said openings are disposed in a middle part of a respective trough.

13. A distributor as set forth in claim 9 wherein said second parts of alternately troughs are disposed at opposite ends of said troughs.

14. A distributor as set forth in claim 9 wherein said troughs are disposed in a common plane with said second parts disposed in an end of some of said troughs and a middle part of others of said troughs.

15. A distributor as set forth in claim 9 wherein said troughs are disposed in two layers with said troughs of one layer perpendicular to the troughs of the other layer.

16. A counter-current column comprising
    at least a pair of vertically spaced apart portions containing packing elements for a vapor liquid exchange;
    a distributor between each said pair of spaced apart portions, said distributor including a base extending across the column, a plurality of vapor flues extending through said base for conveying vapor flows in an upward direction, said vapor flues being distributed over said base at a density of at least ten flues per square meter of base and having a total flow cross-sectional area equal to at most 10% of the cross-sectional area of said base, each said flue having a constriction in the flow cross-section thereof relative to an inlet cross-section; and
    a plurality of tubes depending from said base for draining off liquid distributed between said flues.

17. A column as set forth in claim 16 wherein said tubes extend to a point at least 30 millimeters from a respective portion therebelow.

18. A column as set forth in claim 16 wherein each vapor flue has an outlet near a respective portion thereabove.

19. A column as set forth in claim 18 wherein each vapor flue is spaced from said respective portion thereabove a distance of not more than 50 millimeters.

20. A column as set forth in claim 16 having a flow parameter Phi greater than 0.1 wherein $$Phi = L/G \, (Rho_g/Rho_l)^{\frac{1}{2}}$$

where L is the liquid mass flow, g is the gas mass flow, $Rho_g$ is the density of the gas and $Rho_l$ is the density of the liquid.

* * * * *